INVENTOR
R.H. WININGS
BY J. J. Landis
ATTORNEY 3,437,543
Patented Apr. 8, 1969

3,437,543

APPARATUS FOR POLISHING

Richard H. Winings, Fleetwood, Pa., assignor to Western Electric Company, Incorporated, New York, N.Y., a corporation of New York Filed Mar. 9, 1965, Ser. No. 438,317
Int. Cl. C23f *1/08, 3/00*
U.S. Cl. 156—345 6 Claims

ABSTRACT OF THE DISCLOSURE

A semiconductor slice with an undamaged and uncontaminated polished surface is prepared by using apparatus wherein a moving stream of a chemical etchant is caused to move at high average velocities across the surface of the slice. The chemical etchant and the surface of the slice undergo continuous acceleration and deceleration relative to each other to provide uniform etching that results in a highly polished surface on the slice.

This invention relates to improvements in the art of polishing and, more particularly, to novel apparatus for etch polishing surfaces and the improved polished surfaces that result. For purposes of simplicity and clarity, the invention is described below with specific regard to the surface preparation of semiconductive materials useful in the manufacture of semiconductive devices, although it should be understood that the invention is not so limited and is generally applicable to all types of etch polishing operations.

As a first step in the manufacture of semiconductors, it is conventional to grow large crystals of semiconductive materials. Ordinarily, these semiconductive materials are selected from Group IV elements such as silicon and germanium, from compound Group III and V elements, or from certain semiconductive organic polymeric materials. In accordance with one well-known manufacturing method, the melt from which these crystals are grown is doped with a selected impurity (e.g., a Group III or V element) in order that the entire crystal grown from this melt will be either a p- or n-type semiconductor. The resulting p- or n-type crystal is the subdivided into a series of thin discs, commonly called "slices," and a surface of the slice is exposed to additional impurities of an opposite type from which the crystal was originally doped. The impurity is caused to diffuse or alloy a selected depth into the slice, thereby establishing a p-n junction at the line of furthest penetration of the impurity into the slice. A slice prepared with such a p-n junction is in suitable form for further processing and may be subdivided to provide sufficient semiconductive material for as many as several thousand semiconductive devices.

In the above-outlined methods for preparing semiconductors, it is of considerable importance to provide at least one side of the semiconductive slice with a smooth, regular and undamaged surface. A principal reason for this lies in the fact that the physical condition of the surface of the slice will affect the rate with which the selected p- or n-type impurity will be diffused through and alloyed with the slice. This is especially true when the impurity is diffused or alloyed while it is in a gaseous state, as is a common practice. If the rate of diffusion or alloying is not uniform over the entire cross section of the slice, a clean line of demarcation between the p- and the n-type material will not be obtained. This is undesirable, as the reliability of function of a semiconductive device depends, to a material degree, upon the definition or sharpness of the p-n junction.

The uniformity of the surface of the semiconductive slice is not only of importance in establishing a suitable p-n junction, but is also of consequence in other operations that may be performed on the slice, such as growing oxide layers on the surface of the slice, inscribing fine lines or scrolls on the slice as with diamonds, accurately masking portions of the surface of the slice, removing impurities from the surface of the slice after cleansing operations, etc.

It might be assumed that conventional abrasion-type polishing methods are effective to obtain the desired degree of polish on the surface of the slice since these methods are capable of providing micro finishes. However, abrasion polishing has proved generally unsatisfactory since the slice may be damaged through contact with the abrasive polishing compounds. This damage may be caused by impurities in the form of polishing compound that becomes embedded in the surface or by localized pressure forces that alter the crystal structure of the material underlying the surface of the semiconductive material. In the first instance, the embedment of impurities comprised of small particles of polishing compound will have a deleterious effect upon the final electrical parameters of the semiconductive material. In the second instance, the localized pressure of the particles of fine polishing compound being forced against the surface of the slice can disrupt the crystal structure to a depth equal to the square root of the diameter of the abrasive particles. Even though this undersurface damage may not be visible, it can alter the rate of diffusion and alloying of p- or n-type materials through the slice. Although the reasons why these localized forces alter the rate of diffusion or alloying of the impurity into the crystal are not fully understood, it is believed that small fissures or pores are opened in the surface of the crystal that cause the diffusion or alloying to proceed at different rates at different points across the surface of the slice. However, whatever the reasons, the result is a p-n junction that is not sharp and clear, and so again the electrical properties of the semiconductor are deleteriously affected.

To avoid the above-described damage to the surfaces of semiconductive slices, the use of etch polishing techniques, both chemical and electrochemical, has been proposed. In using the former of these techniques, the surface of the article to be polished is contacted with an etchant that is a chemical solvent for the surface of the material being polished. The etchant dissolves the high spots and irregularities at a preferential rate, leaving a desired smooth surface. Since no pressure forces other than those of the liquid etchant are generated against the surface, and since polishing compounds are not used, the crystal structure of semiconductive materials is not damaged, nor are solid contaminants embedded in their surfaces.

The same advantages generally accrue through the use of electrochemical etching wherein a surface is submerged in an electrolyte and an imposed current "dissolves" the surface irregularities by electrolytic actions. However, little use is made of electrochemical etch polishing methods since, in general, comparable results can be obtained with less complexity through the use of chemical etch polishing methods.

Although chemical etch polishing methods are advantageous in that they do not damage the semiconductive slice, as presently practiced, they are not capable of providing the desired degree of surface polish. It has been observed that two basic difficulties are inherent in chemical etch polishing methods. The first arises due to the evolution of gases caused by the chemical reaction of the etchant and the surface of the article being polished. These evolved gases may attach themselves as a surface coating on the article and so inhibit intimate and uniform contact between the etchant and the surface. This bubble formation is commonly referred to as polarization, and it will result in nonuniform polishing due to the irregular action of the etchant at various points over the surface of the article being polished. Various methods have been devised in an attempt to prevent this polarization. They include the use of brushes that are moved relative to the surface of the article being polished to displace the gas bubbles, scavengers that are added to the etchant to absorb gases as they evolve, and catalytic agents such as platinum that are added to the etchant to facilitate the dissipation of the gaseous by-products as by oxidation. Unfortunately, none of these techniques have proven entirely practicable or satisfactory in preventing polarization during the etch polishing of semiconductive materials.

The second basic difficulty attendant to the use of chemical etch polishing methods relates to the necessity of establishing a uniform velocity of the liquid etchant relative to the surface of the article being polished. While somewhat of an oversimplification, it can reasonably be stated that the degree to which the surface is attacked by the etchant is a direct function of the velocity of the liquid etchant relative to the surface being polished. The important corollary to this proposition is that the uniformity of the polishing is directly dependent upon the uniformity of the relative velocity across the surface of the article being polished. Since, as a practical matter, complete uniformity of this relative velocity cannot be obtained through the use of known etch polishing methods and apparatus, it has not been possible to attain the desired degree of a surface smoothness and uniformity when using chemical etchants to polish semiconductor slices.

Accordingly, it is an object of this invention to provide apparatus for preparing semiconductive slices of high quality.

Another object of this invention is to provide semiconductive slices of high quality that have an undamaged crystal structure and at least one major surface that is uncontaminated, uniform, and highly polished.

A further object of this invention is to provide improved apparatus for practicing chemical etch polishing methods whereby smoother and more regular surfaces can be obtained.

Another object of this invention is to provide apparatus for practicing chemical etch polishing methods whereby polarization and the effects of nonuniform etchant velocities can be minimized.

Still a further object of this invention is to provide semiconductive slices having desirable physical characteristics that facilitate the establishment of sharp p-n junctions.

Briefly, these and other objects of this invention are attained by establishing a moving stream of chemical etchant over the surface of a semiconductive slice to be polished, characterized in that this moving stream has a high average velocity across the surface of the slice, but is continuously caused to accelerate and decelerate with respect to a given point on the surface of the slice. In this manner, the high velocity stream continuously sweeps the surface of the slice free from evolved gases to prevent polarization, and the constant acceleration and deceleration imparts a sufficiently random pattern to the stream to enable the establishment of a substantial uniform average velocity over the entire surface of the slice. In this latter regard, it has now been discovered that it is not necessary to establish a uniform velocity over a surface to be etch polished to obtain uniform results. Rather, the same results can be obtained in a far simpler and more reliable manner by causing the etchant to accelerate and decelerate in as random a manner as possible in order that, during the etching cycle, the velocity of the etchant will average out to substantially the same value with respect to each point on the surface of the article.

In order that this invention can be better understood, it will now be described in connection with the accompanying drawings in which.

Figure 1:
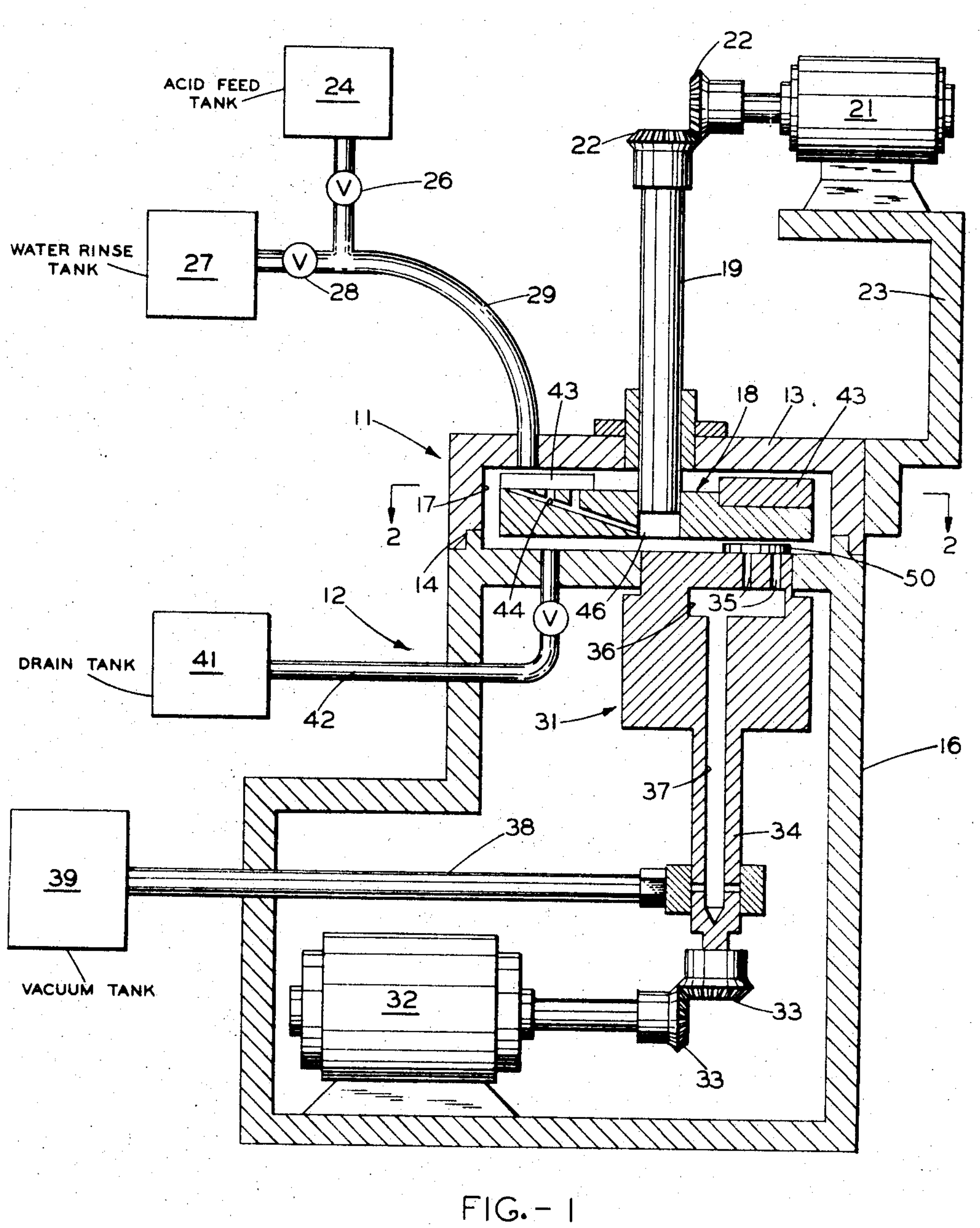
FIG. 1 is a somewhat schematic view, partially in section, of apparatus illustrating one specific embodiment of this invention.

Referring to FIG. 1, there is illustrated a chemical etch polishing apparatus suitable for the practice of this invention. The apparatus, as illustrated, is generally comprised of an upper assembly 11 and a lower assembly 12. A cover section 13 of the upper assembly 11 is mounted, with a seal 14, on a housing 16 of the lower assembly 12 to define a fluid-tight etching chamber 17.

This etching chamber 17 is provided with an applicator wheel 18 mounted for rotation on a shaft 19 that passes in sealing relationship through the upper portion of the cover section 13. The shaft 19 is driven by a motor 21 through suitable gears 22—22. The motor 21 is mounted on a support 23 that is fixedly attached to the cover section 13. This enables the entire upper assembly 11 to be moved in vertical reciprocating relationship with respect to the lower assembly 12, by any conventional means (not shown), to permit placement of slices in the chamber 17.

An acid feed tank 24, having a discharge valve 26, and a water tank 27, having a discharge valve 28, communicate with the etching chamber 17 via a flexible conduit 29.

Contained within the housing 16 of the lower assembly 12 is a rotary table generally indicated by the number 31. This rotary table is journaled for rotation and may be driven by means of motor 32 through gearing 33 and a shaft 34. Means are provided whereby a vacuum can be maintained at several points on the working surface of the rotary table 31. These means include vacuum lines 35—35, a vacuum manifold 36, a drilled passage 37 in the shaft 34, a vacuum line 38, and a vacuum tank or pump 39.

Also associated with the lower assembly 12 is a drain tank 41 that communicates via a valved conduit 42 to a lower portion of the etching chamber 17.

Figure 2:
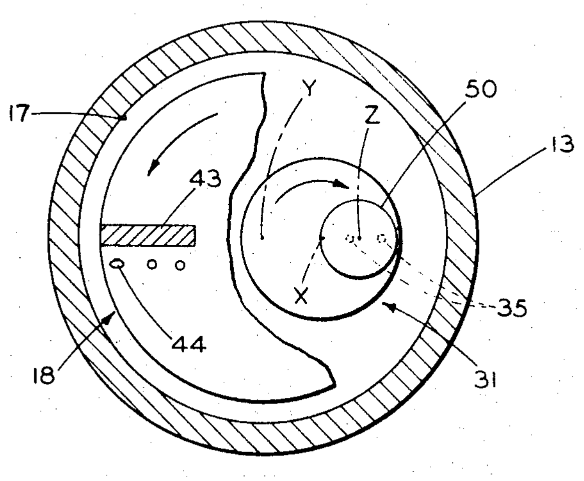
FIG. 2 is a schematic and simplified, horizontal cross-sectional view, partly broken away, taken along line 2—2 of FIG. 1.
Figure 3:
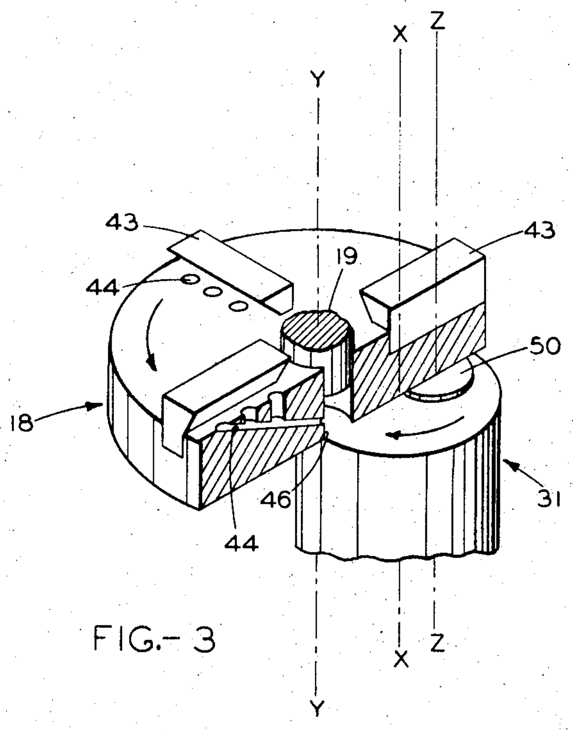
FIG. 3 is a perspective view, partially in section, showing details of an applicator wheel.

In FIG. 3, details of the applicator wheel 18 are illustrated. Extending radially along the upper surface of the applicator wheel 18 is a series of impeller blades 43—43. These blades are slanted to a horizontal axis so that their upper edges are advanced in the direction of rotation of the applicator wheel 18 (indicated by the arrows in FIGS. 2 and 3). At the foot, or attached end, of the impeller blades 43 are positioned feed ducts 44—44 that communicate between the upper surfaces of the applicator wheel 18 and a central, radially inward portion of the applicator wheel. As shown in the drawing, the ducts 44—44 terminate at their lower end within a central bore 46 drilled to receive the shaft 19 above the point where the ducts 44—44 empty into the bore 46.

The relationship of the axes of rotation of the applicator wheel 18 and the rotary table 31 is best illustrated in FIG. 2. As shown therein, not only is the axis of rotation X of the rotary table 31 offset from the axis of rotation Y of the applicator wheel 18, but also the central axis Z perpendicular to the surface of a slice 50 on the table 31 is offset from the axis of rotation X of the rotary table 31. By this means, it can be appreciated that, when the applicator wheel 18 and the rotary table 31 are caused to rotate in opposite directions as indicated by the arrows in FIG. 2, the surface of the semiconductive slice 50 will be moved in a compound path relative to the under surface of the applicator wheel 18.

In the operation of this polishing device, a suitable slice 50 from a single crystal of semiconductive material is first prepared by cutting and lap polishing. Typically, this slice may be approximately one inch in diameter and from 5 to 10 mils in thickness. The lapped slice 50 is positioned on the rotary table 31 directly over vacuum lines 35—35 and the slice is held secure in this position by the pressure forces developed through the vacuum manifold 36 by means of vacuum tank 39 communicating via conduits 37 and 38. The upper assembly 11 is then lowered into sealing relationship with the lower housing 12 (as shown in FIG. 1), leaving a small clearance of approximately one mil between the lower surface of the applicator wheel 18 and the upper surface of the slice 50 (this clearance being exaggerated in FIG. 1).

A chemical etchant for the slice is introduced into the etching chamber 17 from the etchant feed tank 24 via the valve 26 and conduit 29. The motors 21 and 32 are then actuated to cause the applicator wheel 18 and rotary table 31 to rotate in opposite directions with respect to each other as indicated in FIGS. 2 and 3. The rotation of the applicator wheel 18 and its attached impeller blades 43 forces the liquid etchant into and through the feed ducts 44—44 and radially inward through the central bore of the wheel 18 to a location below the wheel. The etchant is then impelled, due to the continuing feed of etchant from feed ducts 44—44 and by centrifugal forces imparted through the rotation of the applicator wheel 18, along the underside of the applicator wheel 18, through the lateral passage between the cover section 13 and the applicator wheel 18, and to the upper side of the applicator wheel. At this point the etchant again comes under the influence of the impeller blades 43—43 and is recirculated via feed ducts 44—44 to the inward lower portion of the applicator wheel 18.

While the etchant is being continuously circulated within the etching chamber 17 and, accordingly, across the surface of the slice 50, the rotation of the rotary table 31 causes the slice to move in a complex path relative to the lower surface of the applicator wheel 18. As a result, the velocity of the etchant relative to the surface of the slice (or, perhaps more precisely, the velocity of the surface of the slice relative to the etchant) is constantly changed in a random manner so that the average velocity of the etchant at any given point is substantially the same over the entire period of time of the polishing cycle. It should be understood that, while the change in velocity of the etchant relative to the surface of the slice is referred to as being random, the motion of the slice relative to the lower surface of the applicator wheel is not at all random, but rather follows a defined geometric path. Accordingly, while the acceleration and deceleration of the etchant relative to the slice is referred to as being random herein, it must be appreciated that this merely describes what is believed to be the nature of the complex movement of the liquid relative to the slice and does not define the motion of the slice with respect to the applicator wheel.

As illustrated herein, the random change in velocity of the surface of the slice relative to the etchant is achieved by providing a rotary table with an axis of rotation eccentric to that of the applicator wheel. Preferably, this randomized acceleration and deceleration can be increased by mounting the axis of the slice eccentric to the rotary table.

After the polishing operation has continued the desired length of time, the valved conduit 42 is opened and the etchant is drained into spent acid tank 41. Next, the valve 28 is opened and wash water from the tank 27 is led via conduit 29 into the etching chamber 17 to wash the chamber and the slice free from any remaining etchant.

It should be noted that the etchant materials used in polishing semiconductive slices, particularly those of Group IV elements, are highly corrosive and generally will contain appreciable amounts of hydrofluoric and other strong acids. As these acids are extremely corrosive to most materials, it is generally necessary to fabricate all parts of the polishing apparatus that come into contact with the etchant from relatively corrosion-proof materials. Certain synthetic resinous materials are particularly useful in this regard, and, of course, the perfluorinated hydrocarbons, such as polytetrafluoroethylene, are especially desirable.

By utilizing the above apparatus, it is possible to prepare semiconductive slices of high quality that are particularly suitable for use in establishing sharp p-n junctions. By way of example, a high quality semiconductive slice is here defined as one that has an undamaged crystal structure and at least one uncontaminated, uniform surface, which surface has a variation not exceeding about 0.3 mil and a maximum roughness not exceeding about 1.0 microinch.

With reference to the various polishing methods discussed above, it has generally been observed that only mechanical or abrasive polishing methods enable the surface preparation of semiconductive slices that meet the above specified standards of surface regularity and smoothness. Typical results indicate that by means of abrasive polishing, a maximum surface variation of about 0.3 mil and a maximum roughness of about 0.9 microinch are obtainable; however, as noted above, these abrasive polishing methods are subject to the disadvantages that they may cause crystal damage and surface contamination. On the other hand, conventional chemical and electrochemical polishing methods, while they will not damage the crystal or embed impurities in its surface, do not yield results better than a surface variation of about 0.6 mil and a roughness of about 1.8 microinches. Accordingly, it may be observed that through the practice of the instant invention, high quality semiconductive slices may be prepared that are superior to any known in the prior art.

Although certain embodiments of the invention have been shown in the drawings and described in the specification, it is to be understood that the invention is not limited thereto, is capable of modification, and can be rearranged without departing from the spirit and scope of the invention.

What is claimed is:

1. Apparatus for chemically etch polishing surfaces, comprising:

applicator means for causing a moving stream of etchant to flow over a surface to be polished without physically contacting such surface, the applicator means including:
- a wheel mounted for rotation, the wheel having a smooth undersurface;
- radially extending impeller blades mounted on the upper surface of the wheel; and
- duct means communicating from the upper surface of the wheel at points adjacent to the leading edges of the impeller blades to a radially inward portion of the lower surface of the wheel; and means for continuously accelerating and decelerating said surface with respect to said moving stream.

2. Apparatus according to claim 1, in which the leading edges of the impeller blades slant forward in the direction of rotation.

3. Apparatus according to claim 1, in which the means for accelerating and decelerating said surface comprises a rotary table mounted for rotation about an axis parallel but eccentric to the axis of rotation of the applicator means.

4. Apparatus according to claim 3, in which the article is secured on the rotary table with its principal axis eccentric to the axis of rotation of the rotary table.

5. Apparatus for chemically etch polishing a surface of an article, which comprises:

a two-part housing having upper and lower sections which can be moved into liquid-sealing relationship to define an etching chamber;

a rotary table mounted for rotation in the lower section of the housing and extending into the etching chamber, including means for mounting the article to be polished on the table for rotation therewith;

a rotary applicator wheel mounted for rotation in the upper section of the housing, extending into the etching chamber, and spaced from the inner walls of the upper section of the housing to permit the continuous circulation of the etchant around the wheel, the rotary applicator wheel including:

a smooth undersurface positioned above the table and spaced from the article when the upper and lower sections are in liquid-sealing relationship with each other;

a plurality of radially extending impeller wheels mounted on the upper surface of the applicator wheel; and duct means communicating from the upper surface of the wheel at points adjacent the leading edges of the impeller blades to a radially inward position of the lower surface of the wheel to enable the rotation of the impeller blades through the etchant in the chamber to force the etchant through the duct means and discharge the etchant in outwardly directed streams across the article on the rotating table;

means for filling the chamber with an etchant for the article; and means for rotating the table and the applicator wheel in opposite directions after the chamber has been filed with etchant, to cause etching of the article mounted on the table.

6. Apparatus according to claim 5 in which the surface to be polished is the flat surface of a semiconductive slice, the slice is mounted eccentrically on the table, and the axes of rotation of the table and the applicator wheel are offset from each other.

References Cited

UNITED STATES PATENTS

| | | | |
|---|---|---|---|
| 3,073,764 | 1/1963 | Sullivan | 156—17 |
| 3,226,277 | 12/1965 | Masuda et al. | 156—345 |
| 3,342,652 | 9/1967 | Reisman et al. | 156—17 |

JACOB H. STEINBERG, *Primary Examiner.*

U.S. Cl. X.R.

134—188, 192; 148—1.5; 156—6, 17; 174—68.5